(12) United States Patent
Ermalovich

(10) Patent No.: US 9,333,135 B2
(45) Date of Patent: May 10, 2016

(54) BOLSTER ATTACHMENT SYSTEM FOR AN ADJUSTABLE BED

(71) Applicant: ERGOMOTION, INC., Santa Barbatra, CA (US)

(72) Inventor: Joseph Ermalovich, Santa Barbara, CA (US)

(73) Assignee: Ergomotion, Inc., Santa Barbara, CA (US)

( * ) Notice: Subject to any disclaimer, the term of this patent is extended or adjusted under 35 U.S.C. 154(b) by 0 days.

(21) Appl. No.: 14/161,876

(22) Filed: Jan. 23, 2014

(65) Prior Publication Data

US 2014/0201915 A1 Jul. 24, 2014

Related U.S. Application Data

(60) Provisional application No. 61/756,286, filed on Jan. 24, 2013.

(51) Int. Cl.
*A61G 7/05* (2006.01)
*A47C 19/02* (2006.01)
*F16B 12/54* (2006.01)
*F16B 12/56* (2006.01)
*F16B 12/60* (2006.01)
*A47C 20/08* (2006.01)
*A47C 21/08* (2006.01)
(Continued)

(52) U.S. Cl.
CPC ............ *A61G 7/0525* (2013.01); *A47C 19/005* (2013.01); *A47C 19/02* (2013.01); *A47C 20/08* (2013.01); *A47C 21/08* (2013.01); *A47C 31/00* (2013.01); *F16B 12/54* (2013.01); *F16B 12/56* (2013.01); *F16B 12/60* (2013.01); *A61G 2007/0508* (2013.01); *A61G 2007/0514* (2013.01); *A61G 2007/0518* (2013.01); *A61G 2007/0522* (2013.01); *Y10T 29/4984* (2015.01)

(58) Field of Classification Search
CPC ................ A61G 7/0525; A61G 7/026; A61G 2007/0508; A61G 2007/0514; A61G 2007/0518; A61G 2007/052; A61G 2007/0522; F16B 12/54; F16B 12/56; F16B 12/60; F16B 12/58; A47C 21/08; A47C 20/08; A47C 31/08; A47C 19/02; A47C 19/005; Y10T 29/4984
USPC .................................. 5/425, 427; 52/718.01
See application file for complete search history.

(56) References Cited

U.S. PATENT DOCUMENTS 2,195,955 A * 4/1940 Hillenbrand ............. 248/231.85
2,648,850 A * 8/1953 Warren ............................. 5/425
(Continued)

*Primary Examiner* — David E Sosnowski
*Assistant Examiner* — David R Hare
(74) *Attorney, Agent, or Firm* — Felix L. Fischer

(57) ABSTRACT

A bed frame with a support structure has a rigid structural frame for carrying an articulating structure for an adjustable bed. The support structure extends substantially to the extents of the articulating structure in an unarticulated position and has a padded bolster. The bolster incorporates a mounting support attached to the structural frame and a resilient foam bumper received on the mounting support with a fabric covering surrounding the bumper and fastened to the mounting support. The articulating structure includes rigid planar supports having edges with a surrounding resilient foam layer having a fabric covering secured to the planar support. The bumper and foam layer are resilient to deform upon contact with an intruding appendage inserted between them. For an exemplary embodiment, an electrical outlet is mounted in a housing which penetrates the support frame, mounting support and bumper.

8 Claims, 10 Drawing Sheets

(51) Int. Cl.
*A47C 31/00* (2006.01)
*A47C 19/00* (2006.01)

(56) References Cited

U.S. PATENT DOCUMENTS

| | | | | |
|---|---|---|---|---|
| 2,877,470 A * | 3/1959 | Roth | ..................... | F16B 12/60 5/131 |
| 3,170,729 A * | 2/1965 | Grant | ..................... | 297/440.15 |
| 4,370,765 A * | 2/1983 | Webber | ..................... | 5/427 |
| 4,439,880 A * | 4/1984 | Koncelik et al. | ..................... | 5/429 |
| 4,672,698 A * | 6/1987 | Sands | ..................... | 5/424 |
| 4,710,992 A * | 12/1987 | Falwell et al. | ..................... | 5/663 |
| 5,044,025 A * | 9/1991 | Hunsinger et al. | ..................... | 5/424 |
| 5,110,650 A * | 5/1992 | Kessler | ..................... | E04F 19/026 24/293 |
| 5,191,663 A * | 3/1993 | Holder et al. | ..................... | 5/424 |
| 5,353,571 A * | 10/1994 | Berdan | ..................... | B60R 13/04 24/293 |
| 5,864,900 A * | 2/1999 | Landau | ..................... | 5/427 |
| 5,867,853 A * | 2/1999 | Feld | ..................... | A47C 19/021 5/424 |
| 5,890,244 A | 4/1999 | Cartwright et al. | | |
| 5,894,616 A * | 4/1999 | Graham et al. | ..................... | 5/424 |
| 5,987,666 A * | 11/1999 | Zigmont | ..................... | 5/424 |
| 6,050,046 A * | 4/2000 | Rykaczewski | ..................... | 52/718.01 |
| 6,076,212 A * | 6/2000 | Feld | ..................... | A47C 19/021 5/424 |
| 6,430,763 B2 * | 8/2002 | Kosumsuppamala et al. | ..................... | 5/425 |
| 6,615,426 B1 * | 9/2003 | Risk, Jr. | ..................... | 5/425 |
| 6,772,484 B2 * | 8/2004 | Miyano | ..................... | B29C 45/4407 24/297 |
| 6,826,790 B1 * | 12/2004 | Polevoy et al. | ..................... | 5/200.1 |
| 6,928,673 B2 | 8/2005 | Risk, Jr. | | |
| 6,990,697 B1 * | 1/2006 | Clute | ..................... | 5/426 |
| 7,363,665 B2 * | 4/2008 | Polevoy et al. | ..................... | 5/200.1 |
| 7,406,731 B2 | 8/2008 | Menkedick et al. | | |
| 8,296,882 B1 * | 10/2012 | Esposito | ..................... | 5/426 |
| 8,832,881 B2 * | 9/2014 | Polevoy | ..................... | A47C 19/021 362/130 |
| 2002/0069462 A1 * | 6/2002 | Gaboury | ..................... | A47C 19/005 5/201 |
| 2003/0097714 A1 * | 5/2003 | Polevoy et al. | ..................... | 5/663 |
| 2007/0209117 A1 * | 9/2007 | Parker | ..................... | 5/663 |
| 2011/0247138 A1 | 10/2011 | Clenet et al. | | |
| 2015/0000040 A1 * | 1/2015 | Deese | ..................... | 5/637 |

\* cited by examiner

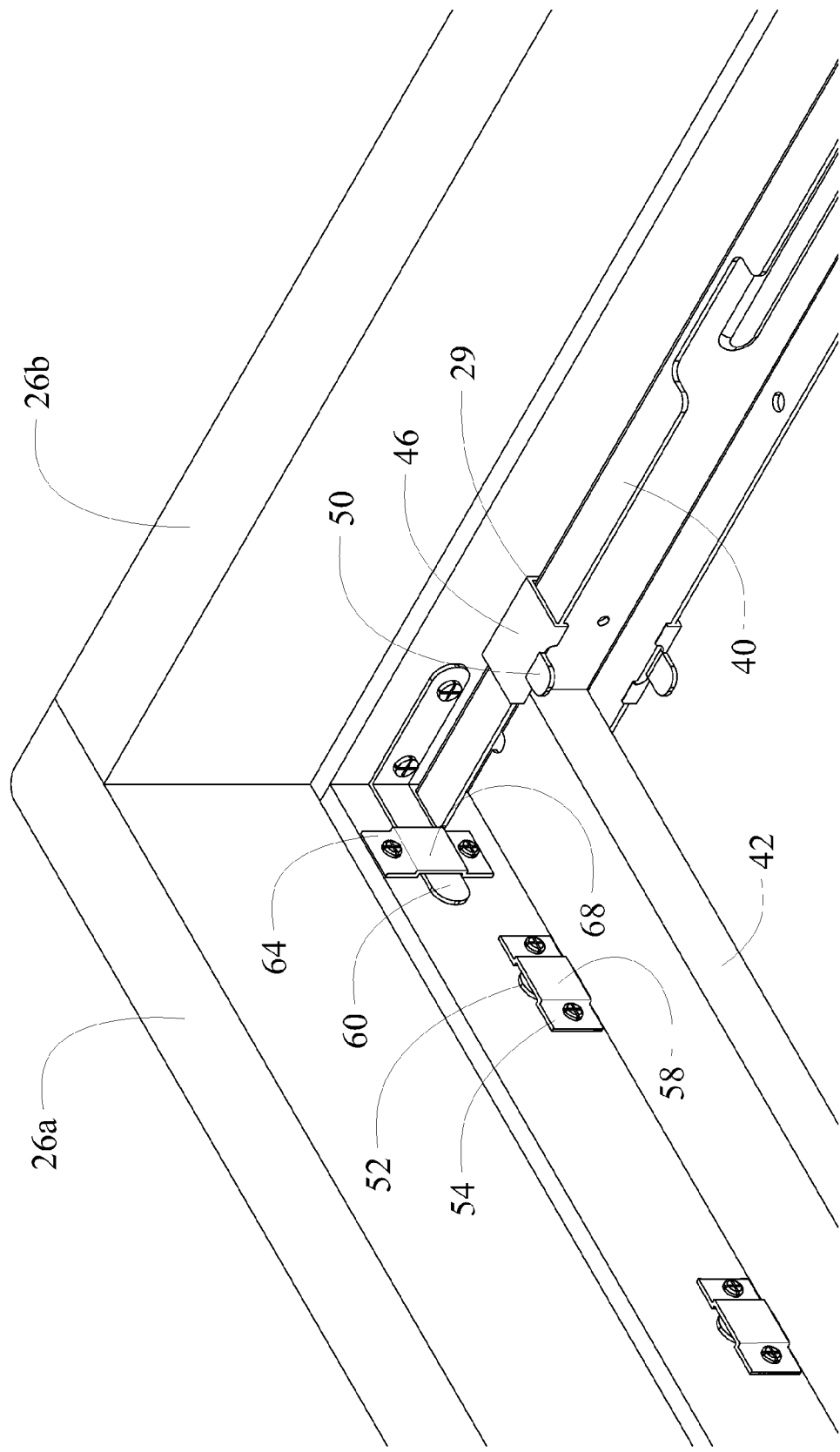

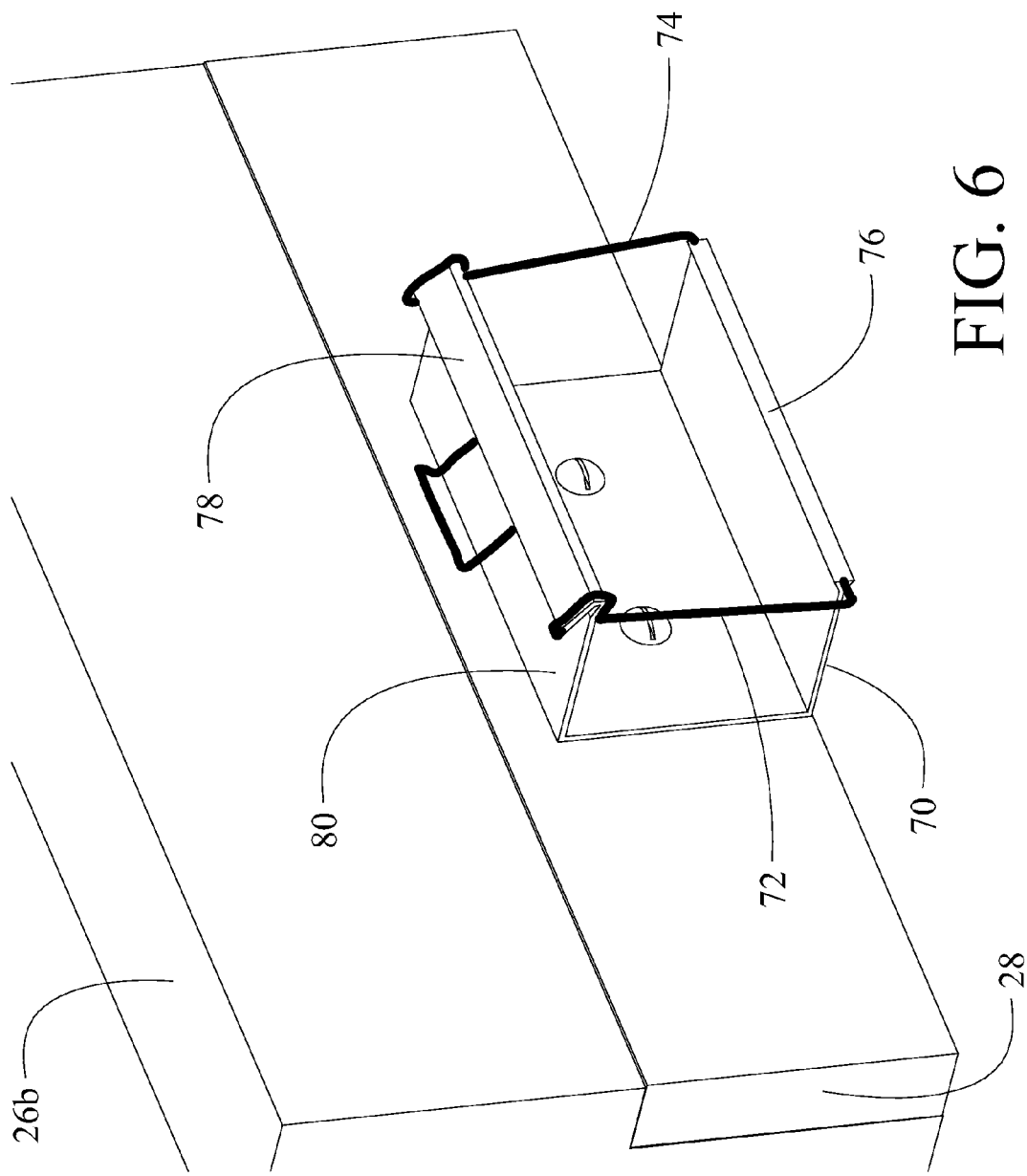

BOLSTER ATTACHMENT SYSTEM FOR AN ADJUSTABLE BED

REFERENCES TO RELATED APPLICATIONS

This application claims priority of U.S. provisional application Ser. No. 61/756,286 filed on Jan. 24, 2013 entitled BOLSTER ATTACHMENT SYSTEM FOR AN ADJUSTABLE BED, the disclosure of which is incorporated herein by reference.

BACKGROUND

1. Field

This invention relates generally to the field of adjustable beds and more particularly to a structure employing a flexible bolster with crushable upper portions for pinch protection in an adjustable bed with positioning attachments.

2. Description of the Related Art

Articulating beds have long been used in hospital and healthcare facilities to allow positioning of a patient in a reclining position, sitting position, elevated leg position or combinations of these positions. General usage of articulating beds has been rapidly expanding due to the comfort and convenience available from adjusting the bed to desired positions for reading, general relaxation or sleeping.

Development of the articulating or adjustable beds for personal or home use has been somewhat hampered by the requirements to camouflage or disguise the operating elements of the bed to provide an aesthetically pleasing appearance as a piece of furniture for use in a home. Additionally in the prior art, the nature of an articulating bed having a moving foot portion typically requires that the underlying support frame be shortened by an offset to avoid a trip or collision hazard when the foot portion is raised or articulated in a manner that would otherwise expose the extremity of the frame underlying the foot portion. Additionally, the portions of the frame which are exposed during articulation of the bed may pose a pinch hazard between the frame and articulated portion when returned to the unarticulated state.

It is therefore desirable to provide a bed frame for an articulating bed which provides a pleasing aesthetic appearance and provides protection to prevent collision injury and pinch hazards.

SUMMARY

The embodiments disclosed herein overcome the shortcomings of the prior art by providing protective bed frame with a support structure having a rigid structural frame for carrying an articulating structure for an adjustable bed. The support structure extends substantially to the extents of the articulating structure in an unarticulated position and has a padded bolster. The bolster incorporates a mounting support and a resilient foam bumper received on the mounting support with a fabric covering surrounding the bumper and fastened to the mounting support. The mounting support is attached to the structural frame. The bumper is resilient to deform upon contact with an intruding appendage inserted between the bolster and articulating frame.

BRIEF DESCRIPTION OF THE DRAWINGS

These and other features and advantages of the present invention will be better understood by reference to the following detailed description of exemplary embodiments when considered in connection with the accompanying drawings wherein:

FIG. 5C is an internal isometric view of the head and side bolster attachment assemblies in the assembled condition; and, FIG. 6 is a side internal isometric view of an alternative bracket configuration.

DETAILED DESCRIPTION

Figure 1:
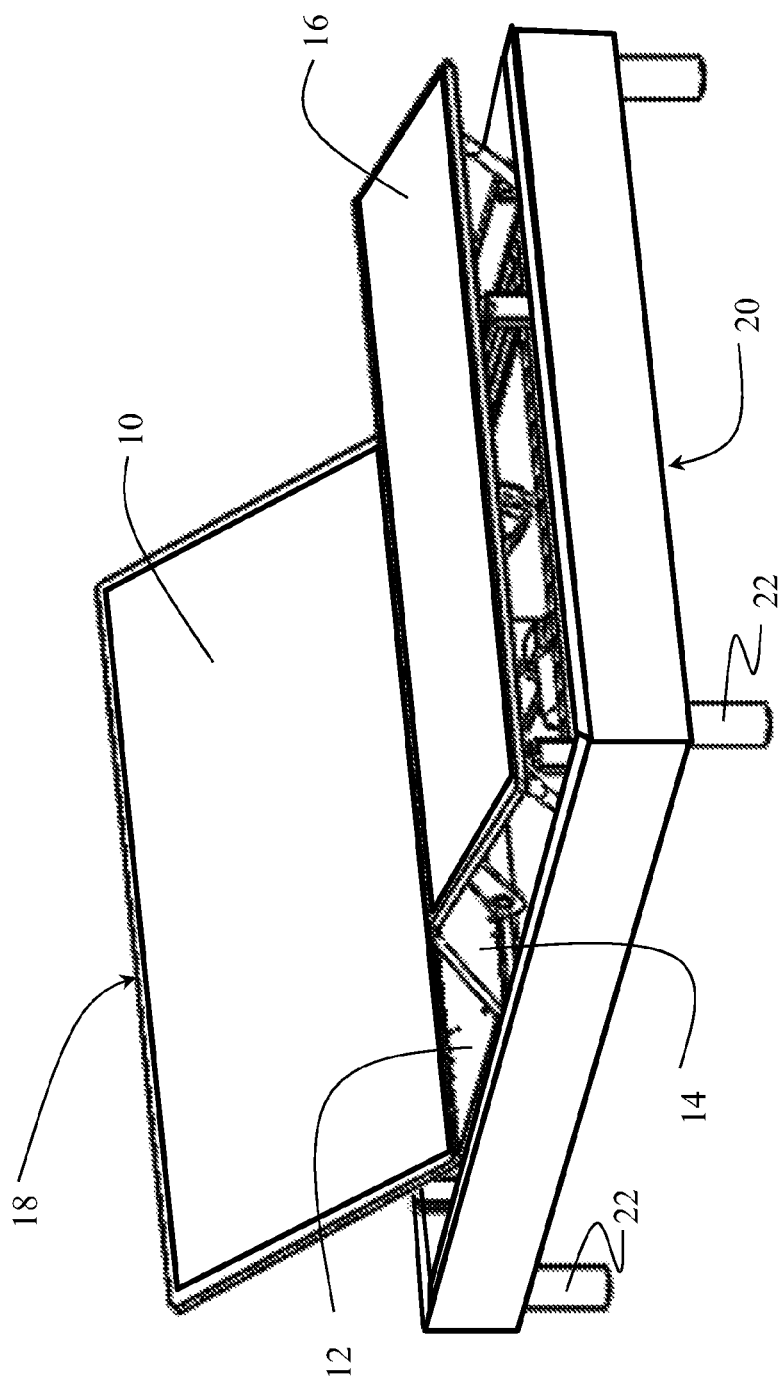
FIG. 1 is an isometric view of an articulating bed employing the present embodiment in an articulated position.

Embodiments shown in the drawings and described herein provide a bed frame for an articulating bed that is an attractive piece of furniture while providing safety benefits for preventing injuries due to collision, pinching and overbalancing. As shown in FIG. 1, the elements of the articulating structure for the bed, shown in an upwardly articulated position for all moving elements, include a head portion 10, a seat portion 12, a thigh portion 14 and a foot portion 16. Each of the articulating elements is formed with a rigid planar support. The combined articulating structure for supporting a mattress is generally designated 18 for reference. Motion of the articulating elements is achieved as disclosed in either U.S. patent application Ser. No. 12/154,509 filed on May 23, 2008 entitled ADJUSTABLE BED FRAME ASSEMBLY or Ser. No. 12/367,538 filed on Feb. 8, 2009 entitled ARTICULATING BED SYSTEM which are referenced as though fully set forth herein.

Figure 2:
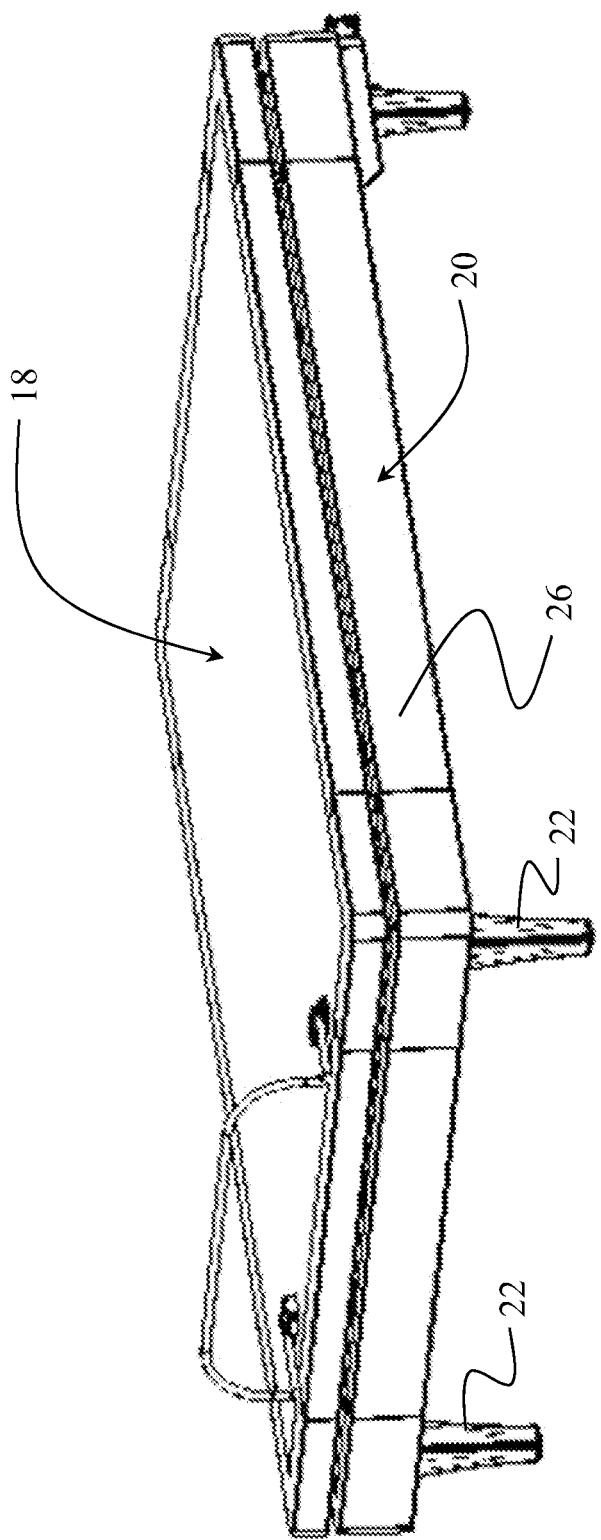
FIG. 2 is an isometric view of an exemplary embodiment of bed frame employing the desired features in an unarticulated position.

Support structure 20 provides a base which extends for the entire length of the articulating structure when flat in the unarticulated state. Legs 22 may be located substantially at the extremities of the support structure corners to provide the greatest stability for the entire bed structure. As shown in FIG. 2 (in the underlying mirrored elements), the support structure incorporates a rigid structural frame 24 which extends substantially around the perimeter of the bed. Legs 22 are mounted from the structural frame substantially at the corners of the bed. A padded bolster 26 surrounds the frame 24.

Figure 3A:
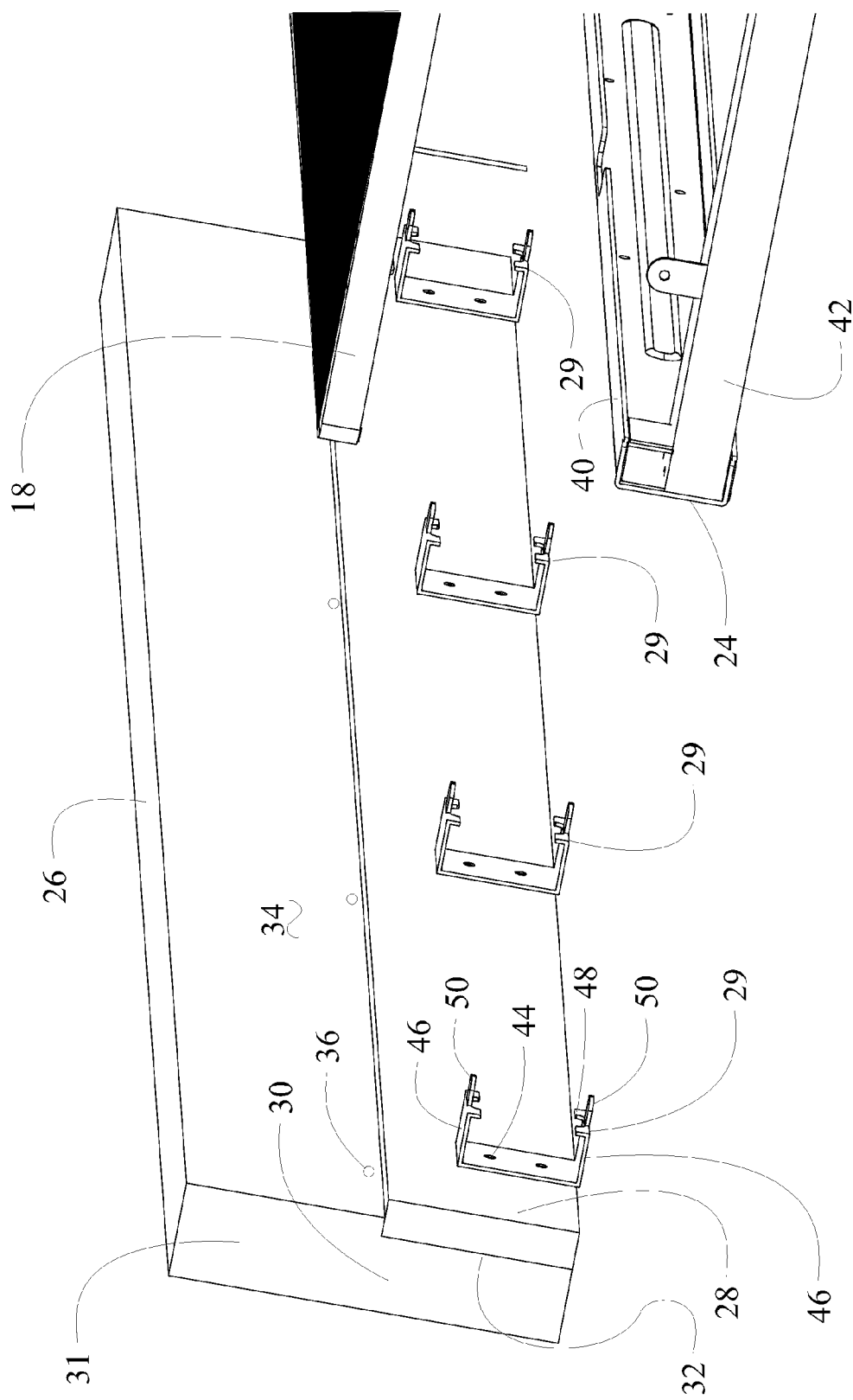
FIG. 3A is a partial section isometric view of the bolster and side frame elements in the unassembled condition.

As shown in FIG. 3A, the bolster 26 employs a mounting support 28 which attaches to the structural frame using brackets 29. A resilient foam bumper 30 is attached to the mounting support 28 and extends out and up to create a resilient collision protection device and a flexible spacer 31 extending above the frame to the articulating structure as will be described in greater detail subsequently. For the embodiment shown the mounting support is of plywood construction and the bumper incorporates a relief 32 to receive the mounting support. A fabric covering 34 surrounds the foam bumper and mounting support and is attached to the mounting support using staples or headed tacks 36 or comparable fastening devices. For the embodiment shown, the fabric covering is an upholstery fabric over an FR mesh which allows the quality furniture appearance for the bed.

As shown in FIG. 2, the extension of the support structure 20 to the extent of the articulating structure 18 allows weight bearing stability for forces such as one or more users sitting at the edge of the bed foot or head. Prior bed frames, particularly in the foot portion, were inset to avoid collision with ankles or shins of a user walking around the bed when the foot support portion was articulated upward. Consequently when the foot support portion was flat in the unarticulated position an overhang was present. One or more persons sitting on the overhang could overbalance the bed or undesirably flex the foot support portion.

Figure 3B:
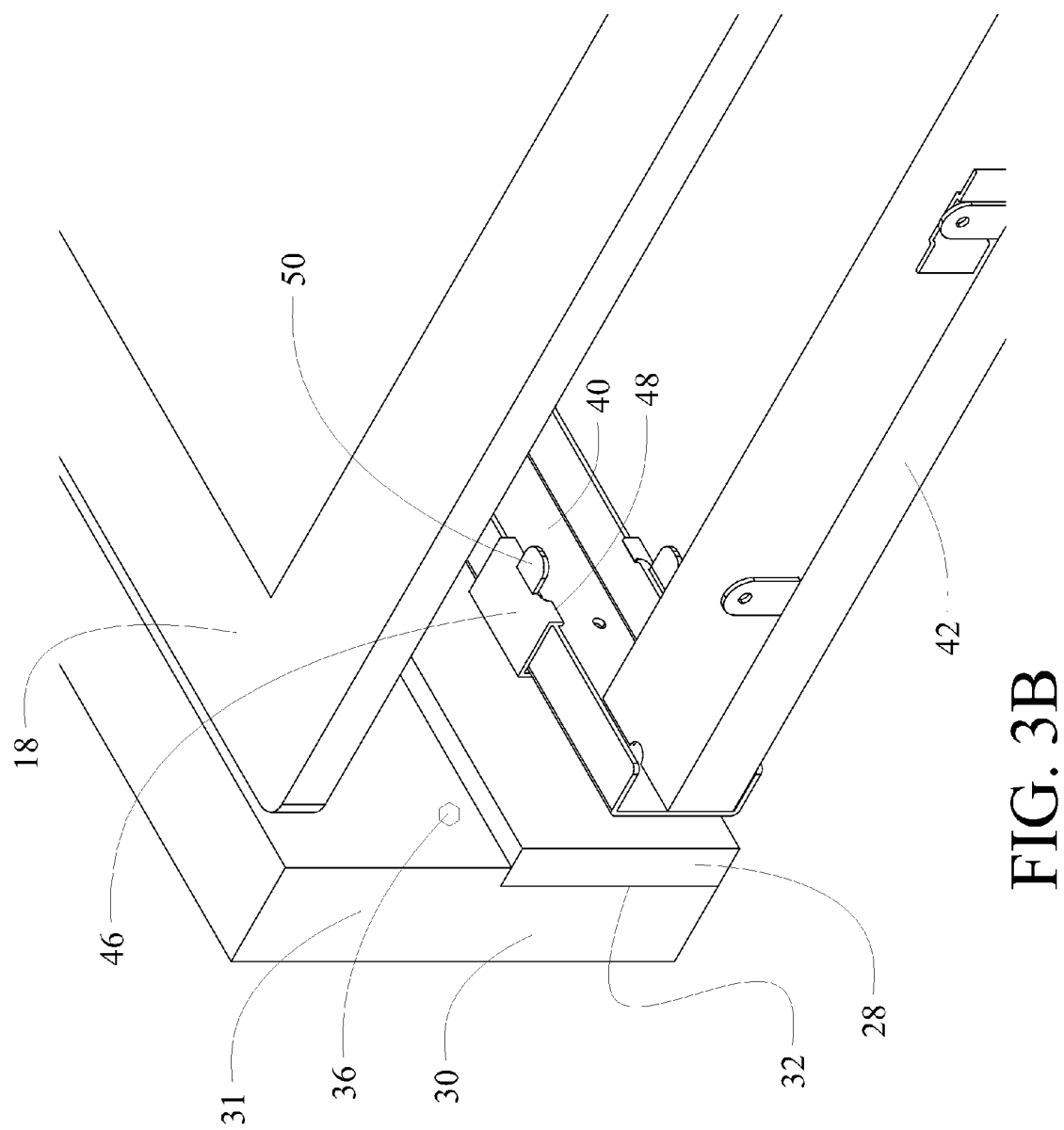
FIG. 3B is a partial section isometric view of the bolster and side frame elements in the assembled condition.

The bed frame of the present embodiment provides the padded bolster extending outward from the rigid structural frame to avoid any injury from collision with the foot portion 16 articulated upwardly as shown in FIG. 1. The pliable resilient foam bumper 30 absorbs any collision forces. Additionally, the resilient foam bumper extends upwardly from the rigid structural frame elements with flexible spacer 31 as best seen in FIGS. 2, 3A and 3B covering the space between the structural frame and the articulating structural elements in the unarticulated position thereby providing a aesthetically pleasing appearance while additionally providing the ability to flex and avoid pinch injury for any appendage such as an arm, hand or finger which might extend into gaps between the articulating structure 18 and the support structure 20 particularly during operation of the articulation mechanisms when the gap may transition from a fairly large dimension with, for example, the foot support portion in the upwardly articulated position (as shown in FIG. 1), to a close tolerance with the foot support portion fully lowered in the unarticulated position (as shown in FIG. 2). Deformation of the pliable resilient foam in the bumper will accommodate any intruding appendage. For the embodiments shown, the bumper 30 with flexible spacer 31 are formed from Extruded Polyethylene (EPE) foam.

As shown in FIGS. 3A and 3B, the frame 24 incorporates side rails 40 and a end rail 42 (a substantially identical end rails are employed in the head and foot of the frame). To accommodate rapid manufacturing assembly of the bolster 26 onto the frame 24, and/or allow shipment of the frame elements of the bed without the bolster attached, the head, foot and sides of the bolster are separate elements attachable to the frame. In an example embodiment for a side element of the bolster, brackets 29 are attached to the mounting support 28 with bolts 44 or comparable fasteners. The brackets 29 are substantially "C" shaped with resilient end plates 46 terminating in grasping teeth 48. For installation, end plates 46 on brackets 29 resiliently expand to be received over the side rails 40 which may be "C" shaped or box extrusions as the brackets 29 are urged laterally against the side rails. Upon installation, grasping teeth 48 are received over an inner edge of the side rail to secure the bracket to the rail with the end plates in an unflexed condition as shown in FIG. 3B. Extending tangs 50 allow flexing of the end plates for removal of the brackets from the rail.

Figure 4A:
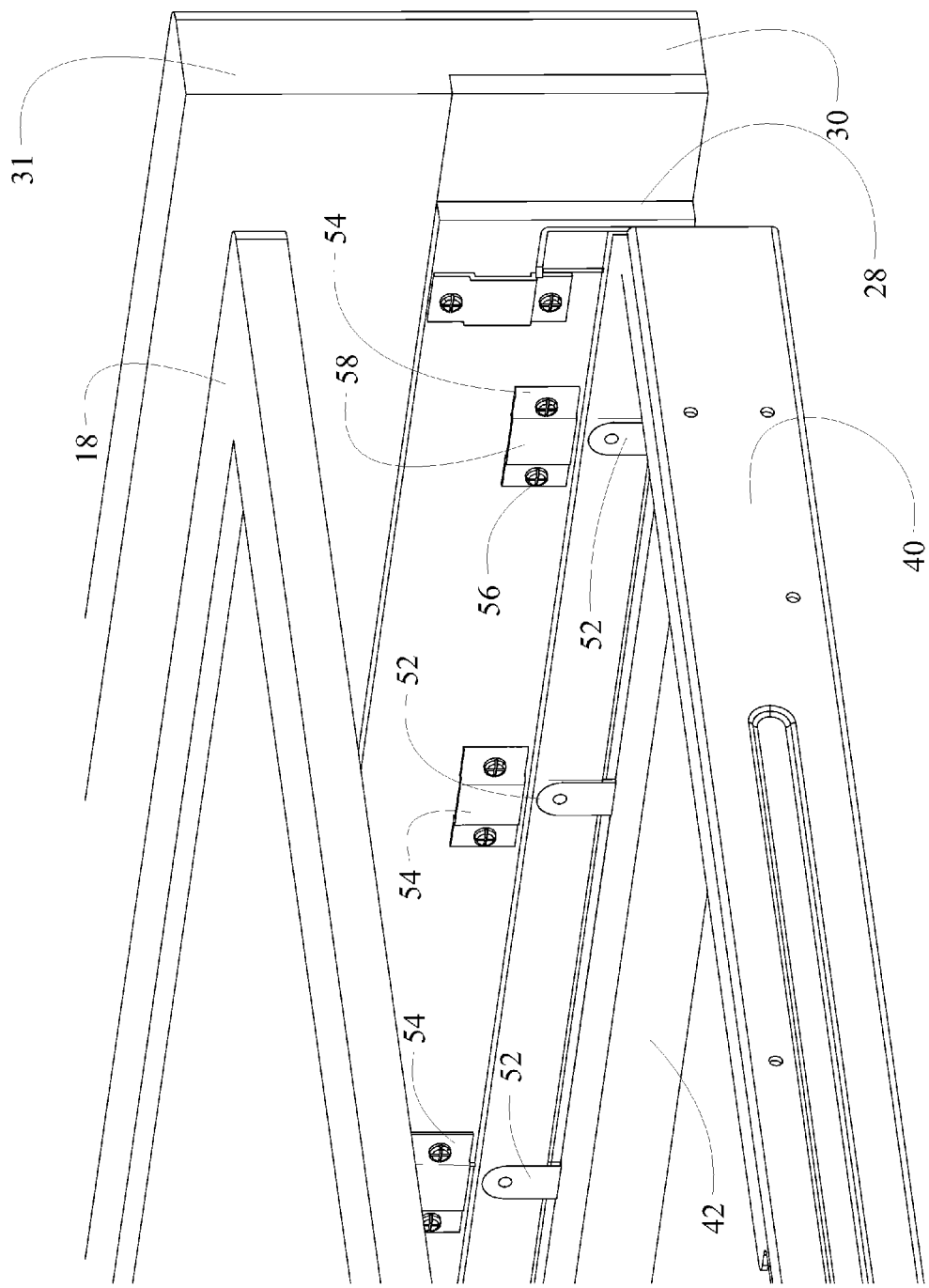
FIG. 4A is a partial isometric view of the bolster and frame head portion in the unassembled condition.
Figure 4B:
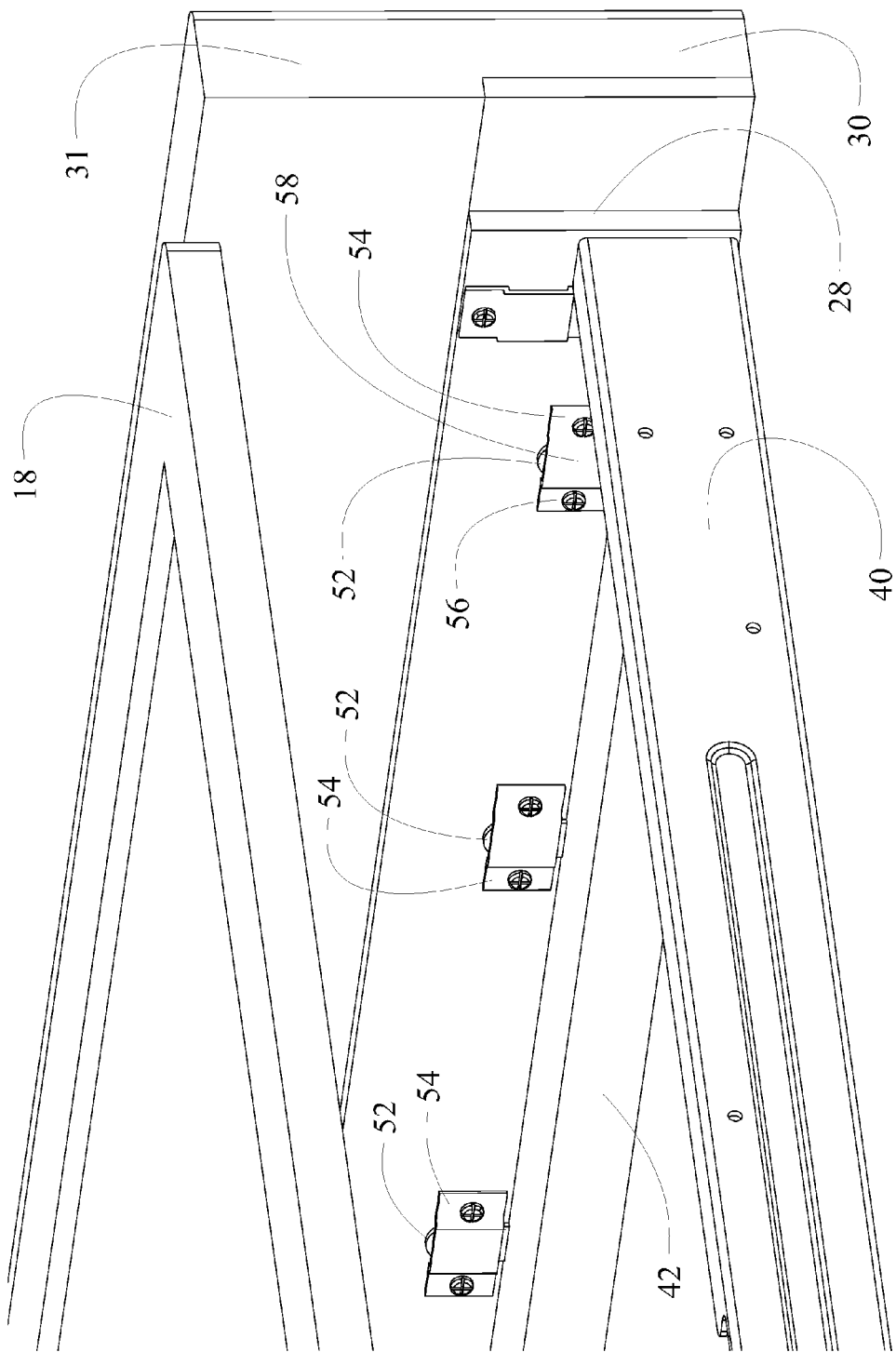
FIG. 4B is a partial isometric view of the bolster and frame head portion in the assembled condition.

An alternative attachment system for elements of the bolster is shown in FIGS. 4A and 4B for attachment of head and foot portions of the bolster in the embodiment shown. Upstanding tangs 52 extend from the end rail 42. Horizontal straps 54 are attached to the mounting support 28 with bolts 56, or similar fasteners, and include an indented center section 58 sized to receive the upstanding tangs 52. The bolster element is attached by sliding the bolster vertically downward from a position as shown in FIG. 4A to engage the indented center sections 58 of the straps 54 on the upstanding tangs 52 as shown in FIG. 4B.

Figure 5A:
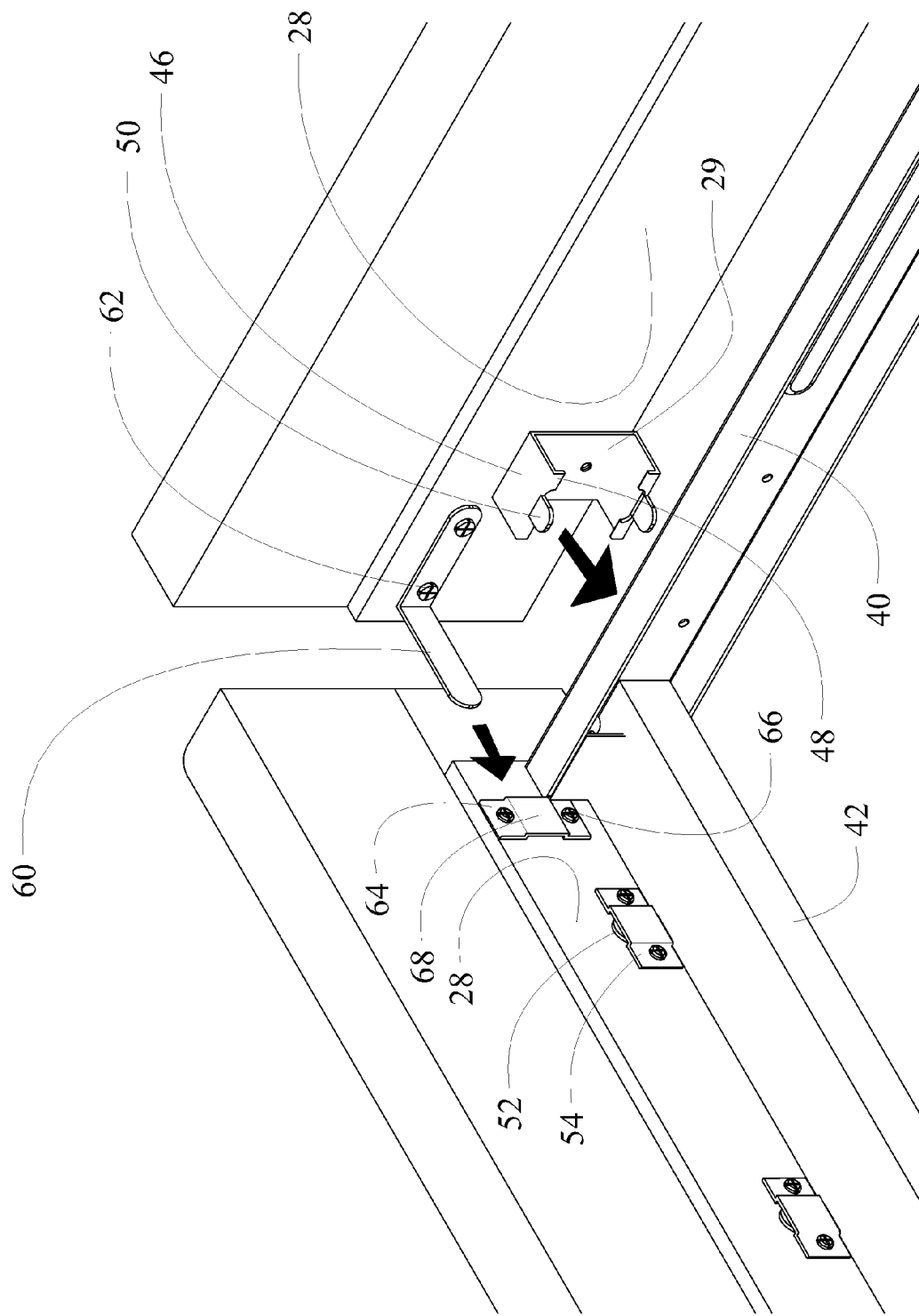
FIG. 5A is an internal isometric view of the head and side bolster attachment assemblies in the unassembled condition.
Figure 5B:
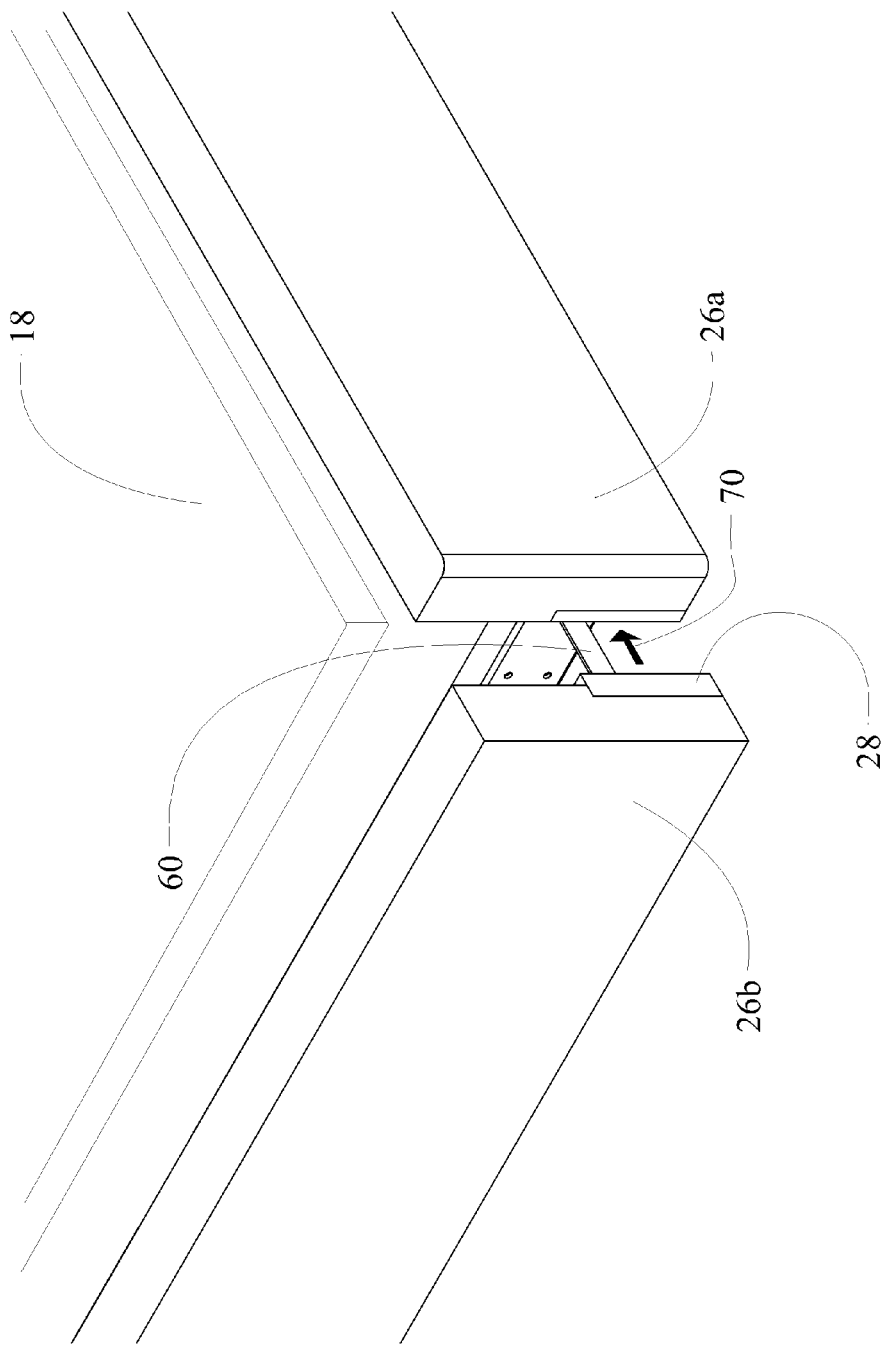
FIG. 5B is an external isometric view of the head and side bolster attachment assemblies in the unassembled condition.

For additional structural support, the attachment systems of FIGS. 3A, 3B and 4A, 4B may be combined for adjacent end bolster element 26a and side bolster element 26b as shown in FIGS. 5A-5C. Additional rigidity of the bolster at the joining corners may be accommodated with an L bracket 60, attached to the mounting support 28 of side bolster element 26b with bolts 62 in the example shown, which is received in a vertical strap 64 attached to the mounting support 28 of the end bolster element 26a with bolts 66, or similar fasteners, and include an indented center section 68 sized to receive the L bracket 60. The end bolster element is attached to the end rail 42 of the frame as described with respect to FIGS. 4A and 4B above. The side bolster element 26b is then attached to the side rail 40 as described with respect to FIGS. 3A and 3B as represented by arrows 70. As the brackets 29 are received over the side rail 40, L bracket 60 is received within the indented center section 68 of vertical strap 64 on the end bolster element 26a providing secure engagement of the bolster elements at the corner as shown in FIG. 5C. The embodiment shown in the drawings employs an overlapping square corner arrangement. In alternative embodiments, a mitered corner on both bolster elements may be employed.

An alternative embodiment for the lateral engagement brackets as described with respect to FIGS. 3A and 3B is shown in FIG. 6. Bracket 70 is substantially "C" shaped to be received over the side rail (not shown). Bracket 70 is attached to the mounting support 28 of the bolster element 26b using bolts 72 or similar fasteners. A resilient bail 74 is pivotally attached to a lower flange 76 of bracket 70 and is received over a latching plate 78 on the upper flange 80. With the side rail received in the bracket 70, bail 74 is rotated around the inner periphery of the side rail and attached to the latching plate thereby securing the bracket to the side rail.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A protective bed frame comprising:
    a support structure having a rigid structural frame with side rails and end rails for carrying an articulating structure for an adjustable bed, said support structure extending substantially to the extents of the articulating structure in an unarticulated position and having
    a padded bolster including a mounting support and a resilient foam bumper received on the mounting support with a fabric covering surrounding the bumper and fastened to the mounting support, said mounting support attached to said structural frame with brackets incorporating
        substantially "C" shaped elements received over the side rails and including grasping teeth extending from end plates to engage a inner edge of the side rail to secure the bracket and further including extending tangs for resiliently bending the end plates to disengage the grasping teeth from the side rail;
    upstanding tangs extending from the end rail;
    horizontal straps attached to the mounting support and including an indented center section sized to receive the upstanding tangs; and,
    an L bracket attached to the mounting support of a side bolster element and a vertical strap attached to the mounting support of an end bolster element, and including an indented center section sized to receive the L bracket.

2. The bed frame as defined in claim 1 wherein the padded bolster comprises a mounting support and a resilient foam bumper received on the mounting support and extending outwardly and upwardly therefrom with a fabric covering surrounding the bumper and fastened to the mounting support.

3. The bed frame as defined in claim 2 wherein the bumper includes a flexible spacer extending upwards from the mounting support surrounding the edges of the planar supports.

4. The bed frame as defined in claim 3 wherein the bumper and flexible spacer are extruded polyethylene foam.

5. The bed frame as defined in claim 1 wherein the padded bolster is resilient to allow deformation by an intruding appendage intermediate the bolster and articulating structure.

6. The bed frame as defined in claim 1 wherein the brackets are substantially "C" shaped and received over the side rails, said brackets further including grasping teeth extending from end plates to engage an inner edge of the side rail to secure the bracket and further including extending tangs for resiliently bending the end plates to disengage the grasping teeth from the side rail.

7. A method for fabricating an articulated bed with a bolstered support frame comprising:

providing a rigid structural frame and a bolster having side bolster elements and end bolster elements with a mounting support;

attaching substantially "C" shaped elements to a side bolster element to be received over the side rails and resiliently expanding grasping teeth extending from end plates to engage an inner edge of the side rail to secure the bracket and further grasping extending tangs for resiliently bending the end plates to disengage the grasping teeth from the side rail;

attaching upstanding tangs to the end rail to extend from the end rail; and attaching horizontal straps to the mounting support of an end bolster element, said horizontal straps including an indented center section sized to receive the upstanding tangs; and, sliding the horizontal straps over the upstanding tangs.

8. The method of claim 7 further comprising:

attaching an L bracket to the mounting support of the side bolster element and attaching a vertical strap to the mounting support of the end bolster element, said vertical strap including an indented center section sized to receive the L bracket, and inserting the L bracket into the vertical strap while attaching the "C" shaped elements to the side rails.

* * * * *